US006722462B2

United States Patent
Ikegami (10) Patent No.: US 6,722,462 B2
(45) Date of Patent: Apr. 20, 2004

(54) OCCUPANT RESTRAINT SYSTEM AND METHOD FOR OPERATING THE SAME

(75) Inventor: Kenji Ikegami, Kanagawa-ken (JP)

(73) Assignee: Nissan Motor Co., Ltd., Kanagawa-ken (JP)

(*) Notice: Subject to any disclaimer, the term of this patent is extended or adjusted under 35 U.S.C. 154(b) by 64 days.

(21) Appl. No.: 10/087,823

(22) Filed: Mar. 5, 2002

(65) Prior Publication Data

US 2002/0134608 A1 Sep. 26, 2002

(30) Foreign Application Priority Data

Mar. 21, 2001 (JP) ..................................... P2001-080679

(51) Int. Cl.⁷ ............................................. B60R 21/32
(52) U.S. Cl. ......................... 180/282; 280/735; 701/45
(58) Field of Search ..................... 280/735; 180/274, 180/282; 701/45, 46, 47; 340/436, 438

(56) References Cited

U.S. PATENT DOCUMENTS

| 5,749,059 A | 5/1998 | Walton |
| 5,969,598 A | 10/1999 | Kimura |
| 6,274,948 B1 * | 8/2001 | Blank et al. ................ 307/10.1 |
| 6,426,567 B2 * | 7/2002 | Ugusa et al. ................ 280/735 |
| 6,530,597 B1 * | 3/2003 | Nesper et al. .............. 280/735 |

FOREIGN PATENT DOCUMENTS

| EP | 1 040 967 | 10/2000 |
| JP | 9-240419 | 9/1997 |

\* cited by examiner

*Primary Examiner*—Peter C. English
(74) *Attorney, Agent, or Firm*—McDermott, Will & Emery (57) ABSTRACT

An occupant restraint system and a method for operating the same are disclosed as including an impact detector unit (3) having two impact sensors (6a, 6b), which detect impact to produce sensory outputs representing impact status that is classified into three discriminating factors including an actuation demand timing judgment factor, calculation enabling judgment factor and an operation enabling judgment factor, and outputting data representative of ON/OFF states of the discriminating factors. A control unit (4) receives data, transmitted from the impact detector unit and representing ON/OFF states of the discriminating factors, and detects transition processes of received data for outputting an actuation signal to operate an occupant restraint device (2) when detected transition process is determined to be correct. Thus, the operation of the occupant restraint device is precisely controlled without being adversely affected by noise.

6 Claims, 8 Drawing Sheets

FIG.2

| TRANSMISSION DATA | ACTUATION DEMAND TIMING JUDGMENT | CALCULATION START JUDGMENT | OPERATIONAL STATE JUDGMENT | STAGE |
|---|---|---|---|---|
| DATA 0 | 0 | 0 | 0 | NORMAL |
| DATA 1 | 0 | 0 | 1 | STAGE 1-A |
| DATA 2 | 0 | 1 | 0 | STAGE 1-B |
| DATA 3 | 0 | 1 | 1 | STAGE 2-A |
| — | 1 | 0 | 0 | NO PHYSICAL PRESENCE |
| — | 1 | 0 | 1 | NO PHYSICAL PRESENCE |
| DATA 4 | 1 | 1 | 0 | STAGE 2-B |
| DATA 5 | 1 | 1 | 1 | ACTUATION JUDGMENT (PATH 1) |
| DATA 6 | 1 | 1 | 1 | ACTUATION JUDGMENT (PATH 2) |
| DATA 7 | 1 | 1 | 1 | ACTUATION JUDGMENT (PATH 3) |

OCCUPANT RESTRAINT SYSTEM AND METHOD FOR OPERATING THE SAME

BACKGROUND OF THE INVENTION

The present invention relates to occupant restraint systems, such as an air bag and a pretensioner of a seat belt, mounted in a vehicle and, more particularly, an occupant restraint system and a method for operating the same for precluding an occupant restraint device from being improperly operated due to adverse effects caused by noises.

It has been a usual practice for an occupant restraint system of a vehicle to have an impact detector section, which detects impact, and a control section which controls the actuation of an occupant restraint device, with the impact detector section and the control section being mechanically separate from one another and electrically connected to one another by means of a communication line. When the impact detector section detects an impact on the vehicle and discriminates a need for operating the occupant restraint device, the impact detector section transmits an actuation demand signal to the control section via the communication line. Upon receipt of the actuation demand signal, the control section instantaneously deploys the occupant restraint device for thereby restraining the occupant in a safe condition.

During such operation, the presence of the communication line connected between the impact detector section and the control section is apt to cause an adverse effect on a proper operation of the restraint device owing to noise in the communication line. One technology for addressing such an issue is disclosed in Japanese Patent Provisional Publication No. 9-240419 (which will be hereinafter referred to as a related art).

The technology disclosed in the above Publication produces communication signals at different output frequencies in an impact detector section while classifying a process, through which restraint judgment is implemented upon discriminating impact, into a plurality of stages which are allocated with particular output frequencies, respectively. Then, the impact detector section transmits output signals to the control section at the relevant frequencies associated with respective judgment stages. The control section discriminates the frequencies of the received signals and deploys the occupant restraint device when the signals are received from the impact detector section in a predetermined sequence.

However, upon receipt of the actuation signal, for the occupant restraint device, delivered from the impact detector section, although it is desirable for the control section to instantaneously allow the occupant restraint device to be deployed, the control section of the related art must receive the output signals from the impact detector section for a prolonged period of time in order to appropriately discriminate the output frequencies of the received signals from one another. To preclude the adverse effect caused by temporary variation in the output frequencies of the received noisy signals, it is required for the control section to receive the signals from the impact detector section for a further prolonged period of time.

SUMMARY OF THE INVENTION

The present invention has been made with a view to addressing the above issue and has an object of the present invention to provide an occupant restraint system and a method for operating the same which is able to preclude the system from being adversely affected by noise while enabling an occupant restraint device to be instantaneously deployed upon receipt of a restraint actuation signal from an impact detector unit.

In accordance with one aspect, the present invention provides an occupant restraint system for a vehicle having an occupant restraint device to permit the occupant restraint device to be deployed for restraining the occupant in the vehicle when impact, exerted to the vehicle, is detected, said system comprising: an impact detector unit including an impact sensor detecting impact exerted to a vehicle to provide a sensory output representative of an impact status, said impact detector unit being responsive to the impact status for providing at least two discriminating factors based on which at least two predetermined transition processes are programmed, to cause said occupant restraint device to be deployed, and producing information representing an ON/OFF state (or "enabled/disabled state") of the discriminating factors involving transition process information of the transition processes; and a control unit outputting an actuation signal to said occupant restraint device when there is a confirmed match between a variation in said information, representing said ON/OFF state, received from said impact detector unit, and—the transition process information.

In accordance with another aspect, the present invention provides an occupant restraint system for a vehicle having an occupant restraint device to permit the occupant restraint device to be deployed for restraining the occupant in the vehicle when impact, exerted to the vehicle, is detected, said system comprising: an impact detector unit including at least two impact sensors detecting impact exerted to a vehicle to provide sensory outputs representative of impact status, said impact detector unit being responsive the impact status for providing at least two discriminating factors based on which at least two predetermined transition processes are programmed, to cause said occupant restraint device to be deployed, and producing information representing ON/OFF state of said discriminating factors involving transition process information representing said transition processes; and a control unit outputting an actuation signal to said occupant restraint device when there is a confirmed match between a variation in said information representing said ON/OFF state, received from said impact detector unit, and said transition process information.

In other words, the present invention provides an occupant restraint system for a vehicle having an occupant restraint device to permit the occupant restraint device to be deployed for restraining the occupant in the vehicle when impact, exerted to the vehicle, is detected, said system comprising: impact detecting means detecting impact exerted to a vehicle to provide a sensory output representative of an impact status, said impact detecting means being responsive the impact status for providing at least two discriminating factors based on which at least two predetermined transition processes are programmed, to cause said occupant restraint device to be deployed, and producing information representing an ON/OFF state of the discriminating factors involving transition process information of the transition processes; and control means outputting an actuation signal to said occupant restraint device when there is a confirmed match between a variation in the information representing said ON/OFF state, received from impact detecting means, and the transition process information.

In still other words, the present invention provides an occupant restraint system for a vehicle having an occupant restraint device to permit the occupant restraint device to be deployed for restraining the occupant in the vehicle when impact, exerted to the vehicle, is detected, said system comprising: impact detecting means including at least two impact sensors detecting impact exerted to a vehicle to provide sensory outputs representative of impact status, said impact detecting means being responsive to the impact status for providing at least two discriminating factors based on which at least two predetermined transition processes are programmed, to cause said occupant restraint device to be deployed, and producing information representing an ON/OFF state of the discriminating factors involving transition process information of the transition processes; and control means outputting an actuation signal to said occupant restraint device when there is a match between a variation in said information representing said ON/OFF state, received from said impact detecting means, and the transition process information.

In accordance with still another aspect, the present invention includes a method for operating an occupant restraint system for a vehicle having an occupant restraint device to permit the occupant restraint device to be deployed for restraining the occupant in the vehicle when impact, exerted to the vehicle, is detected, said method comprising: detecting impact exerted to a vehicle to provide a sensory output representative of an impact status; preparing at least two discriminating factors based on which of at least two predetermined transition processes are determined to cause said occupant restraint device to be deployed; producing information representing an ON/OFF state of the discriminating factors involving transition process information of the transition processes; and outputting an actuation signal to said occupant restraint device when there is a confirmed match between a variation in said information representing said ON/OFF state and said transition process information.

In accordance with yet another aspect, the present invention includes a method for operating an occupant restraint system for a vehicle having an occupant restraint device to permit the occupant restraint device to be deployed for restraining the occupant in the vehicle when impact, exerted to the vehicle, is detected, said method comprising: detecting impact exerted to a vehicle using at least two impact sensors to provide sensory outputs representative of impact status; preparing at least two discriminating factors based on which at least two predetermined transition processes are programmed to cause said occupant restraint device to be deployed; producing information representing an ON/OFF state of the discriminating factors involving transition process information of the transition processes; and outputting an actuation signal to said occupant restraint device when there is a confirmed match between a variation in said information representing said ON/OFF state and said transition process information.

DETAILED DESCRIPTION OF THE PREFERRED EMBODIMENTS

Figure 1:
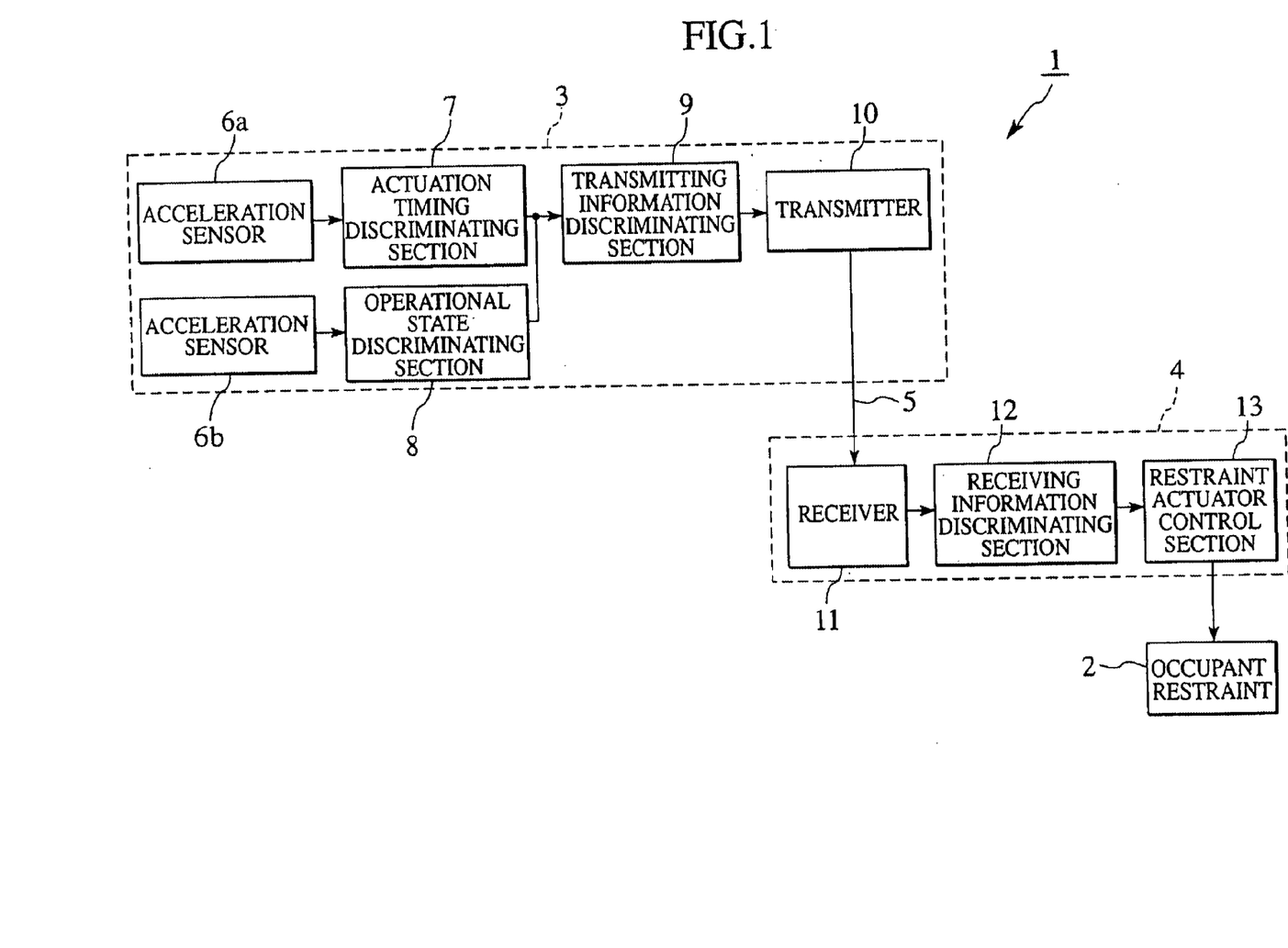
FIG. 1 is a block diagram illustrating a structure of an occupant restraint system of a preferred embodiment according to the present invention.

To describe the present invention more in detail, a representation of the present invention is schematically shown in FIG. 1 as an occupant restraint system, for a vehicle, of a preferred embodiment.

The restraint system 1 includes a restraint device 2. The restraint device may be comprised of one of or any combination of devices. For, example, the restraint device 2 may be actuatable occupant restraint device that is mounted in the vehicle for restraining a vehicle occupant when the vehicle encounters an impact. Example of such an occupant restraint device includes an air bag device, a seat belt lock, and a seat belt pretensioner. The system 1 further includes an impact detector unit 3 which detects a front impact, a side impact or rollover (turnover) as a characteristic that is used to determine whether a vehicle occupant is to be restrained, and a control unit 4 for applying an actuation signal to the restraint device 2 when impact is detected with the impact detector unit 3. To this end, the impact detector unit 3 and the control unit 4 is electrically connected through a communication line 5.

The impact detector unit 3 is comprised of first and second acceleration sensors (impact sensors) 6a, 6b that detect impact applied to the vehicle for producing first and second sensory outputs, respectively, in response thereto, an actuation timing discriminating section 7 responsive to the first sensory output for discriminating an actuation timing at which the occupant restraint device 2 is deployed, and an operational state discriminating section 8 responsive to the second sensory output for determining if a deployment impact condition is occurring for actuating the restraint device 2.

The occupant restraint system 1 further includes a transmitting information discriminating section 9 which responds to outputs of the actuation timing discriminating section 7 and the operational state discriminating section 8 to discriminate changes in discriminating factors (that are classified into an actuation demand timing judgment factor, a calculation enabling judgment factor and an operation enabling judgment factor) for producing data representative of such discriminating factors, and a transmitter 10 which transmits data produced from the transmitting information discriminating section 9 to the control unit 4 via the communication line 5.

The actuation timing discriminating section 7 serves to execute two functions, i.e. the actuation demand timing judgment and the calculation start judgment. Among these functions, the actuation request timing judgment factor is enabled when an integral result of the sensory output of the first acceleration sensor 6a exceeds a first threshold value. Further, the calculation start judgment is turned ON when the sensory output of the first acceleration sensor 6a exceeds a second threshold value.

The operational state discriminating section 8 is enabled when an integral result of the sensory output of the second acceleration sensor 6b exceeds a third threshold value. For the purpose of illustration of the invention and not for the purpose of limitation, the first and third threshold values are exemplarily determined to be substantially identical to one another to cause the sample shown in FIG. 1 to operate in two modes, i.e. a first mode wherein the actuation demand timing judgment is first enabled in response to the first and second acceleration sensors 6a, 6b, and a second mode wherein, on the contrary, the operational state judgment is first enabled.

On the other hand, the control unit 4 is comprised of a receiver 11 which receives data representative of the discriminating factors transmitted from the impact detector unit 3, a receiving information discriminating section 12 configured to compare a plurality of preliminarily programmed transition processes with relevant transition processes containing data, representative of the discriminating factors, received by the receiver 11 with a view to making a determination as to whether the preliminarily programmed transition processes coincide with the transition processes containing preset data representative of the discriminating factors for producing a coincidence signal when these parameters match with one another, and a restraint actuator control section 13 which outputs a trigger signal on the occupant restraint devices 2 in response to the coincidence signal delivered from the receiving information discriminating section.

Now, the different discriminating factors are described below in detail with reference to FIG. 2.

Figure 2:
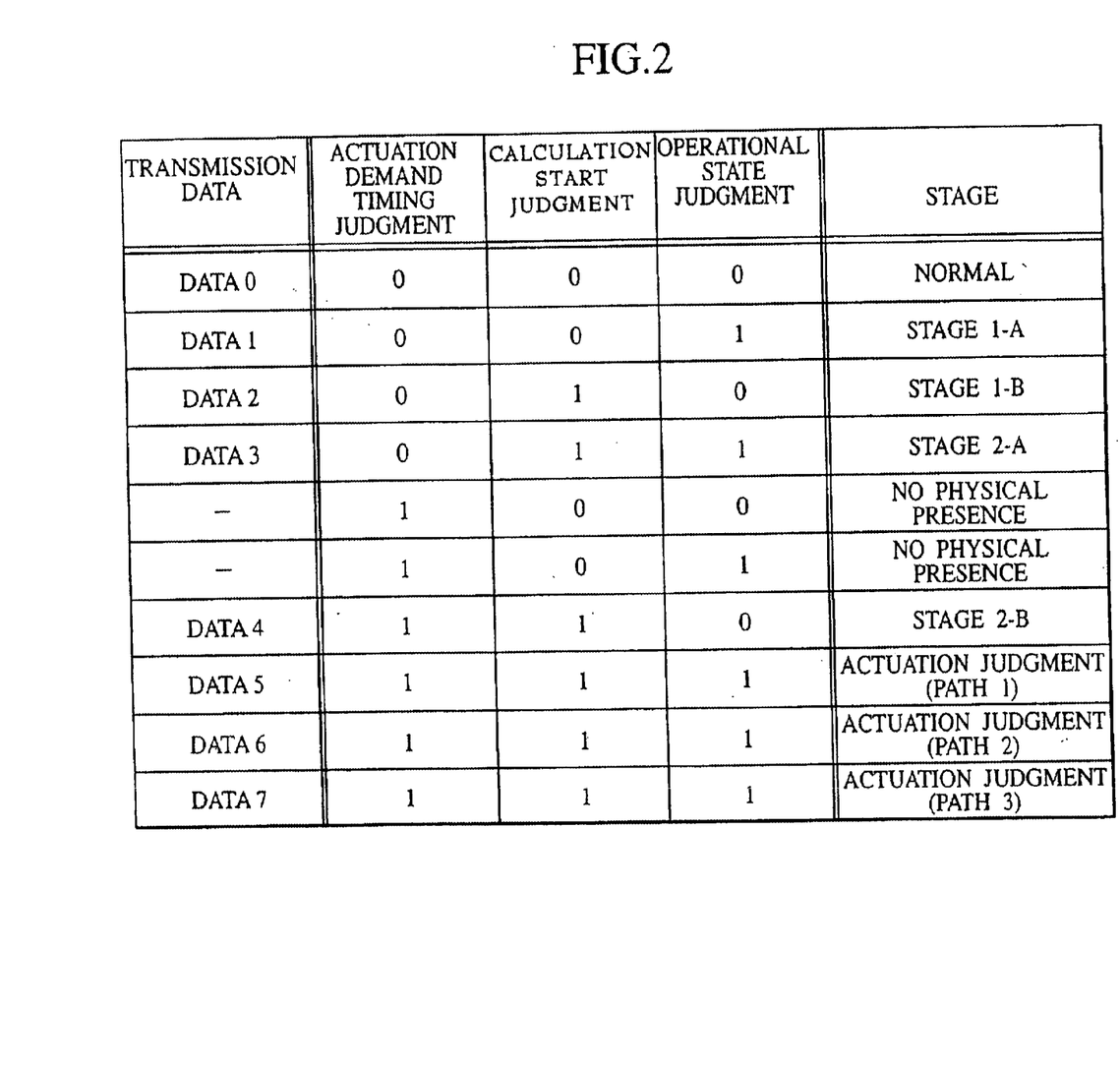
FIG. 2 is a table illustrating the relationship between relevant statuses of respective discriminating factors and transmitted data.

FIG. 2 shows a table illustrating the relationship among ON/OFF states of the respective discriminating factors (i.e. the actuation demand timing judgment, the calculation start judgment and the operative state judgment), correlated transmitting data (involving DATA1 to DATA7) and associated stages (which will be discussed later in detail). It is to be noted that binary values "1" and "0" are assigned to an "ON" state and an "OFF" state of the discriminating factors, respectively.

When both the first and second acceleration sensors 6a, 6b produce no outputs representative of the variation in the acceleration, the discriminating factors remain in the "OFF" state and, so, DATA 0 is represented by three decimal numbers (0, 0, 0). Also, the three decimal numbers (0, 0, 0) represent the actuation demand timing judgment, the calculation start judgment and the operative state judgment, respectively, in sequence from the left.

Further, in a case where the integral result of the sensory output produced by the second acceleration sensor 6b exceeds the third threshold value, the operative state judgment is enabled and, so, DATA 1 is represented by the three decimal numbers (0, 0, 1). Similarly, DATA 2 is represented by the three decimal numbers (0, 1, 0), DATA 3 is represented by the three decimal numbers (0, 1, 1), DATA 4 is represented by the three decimal numbers (1, 1, 0) and DATA 5 to DATA 7 are represented by the three decimal numbers (1, 1, 1).

Also, it is to be noted that there can be no actual occurrences of the three decimal numbers (1, 0, 0) and (1, 0, 1). That is, since the calculation start judgment is enabled at a timing earlier than the actuation demand timing judgment, there are no possibilities where the three decimal numbers (1, 0, 0) and (1, 0, 1) exist. Further, the results of respective judgments are irreversible such that once a particular judgment is enabled, i.e. the binary "1", the particular judgment does not revert to the binary "0" (OFF) state.

Transition processes that vary in dependence on the respective discriminating factors are described below in detail with reference to FIG. 3. The receiving information discriminating section 12 stores pre-programmed stages, representing the transition processes, such as "NORMAL STAGE", "STAGE 1-A", "STAGE 1-B", "STAGE 2-A", "STAGE 2-B" and "FINAL STAGE". Also stored in the receiving information discriminating section 12 are proper transition processes (including proper routes passing through the respective stages), such as a first path, a second path and a third path.

Figure 3:
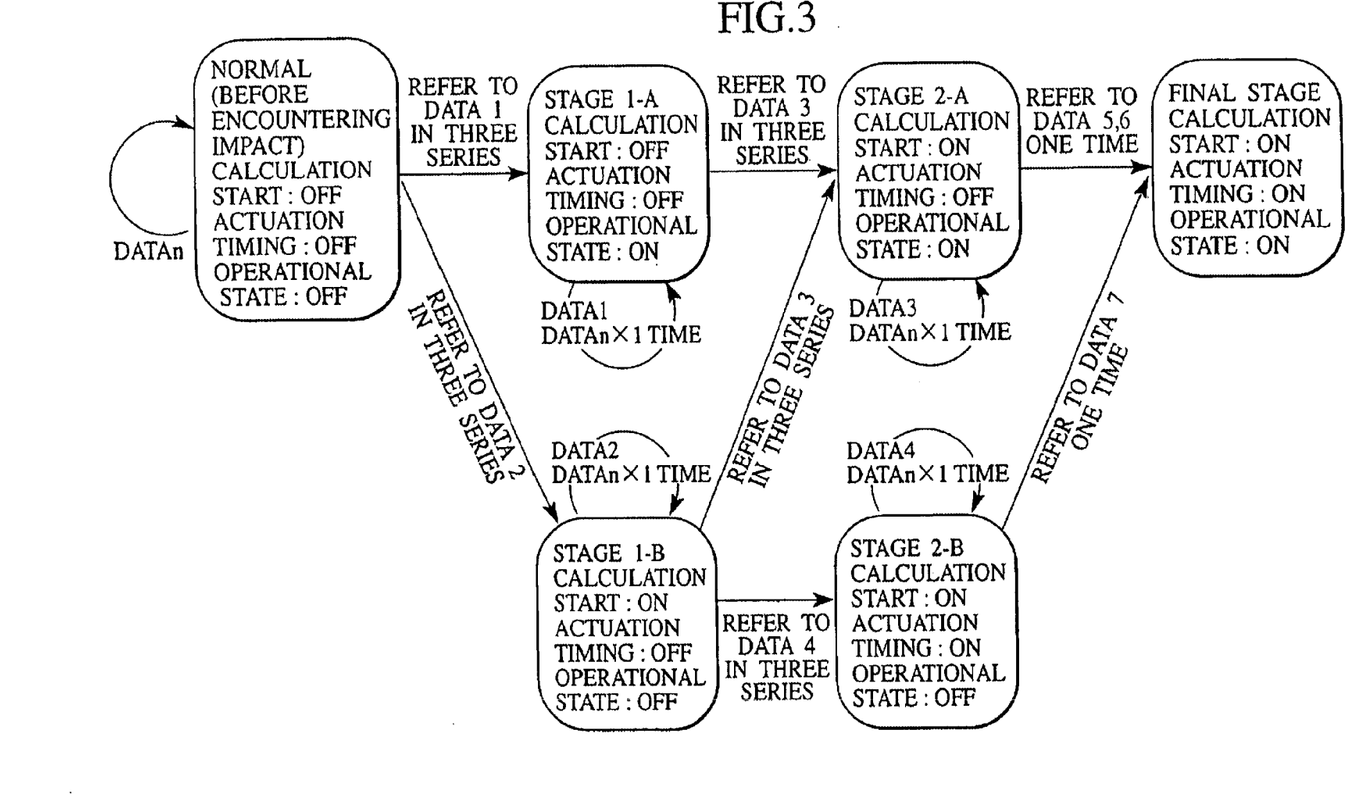
FIG. 3 is a view illustrating a transition process in respective stages.
Figure 9:
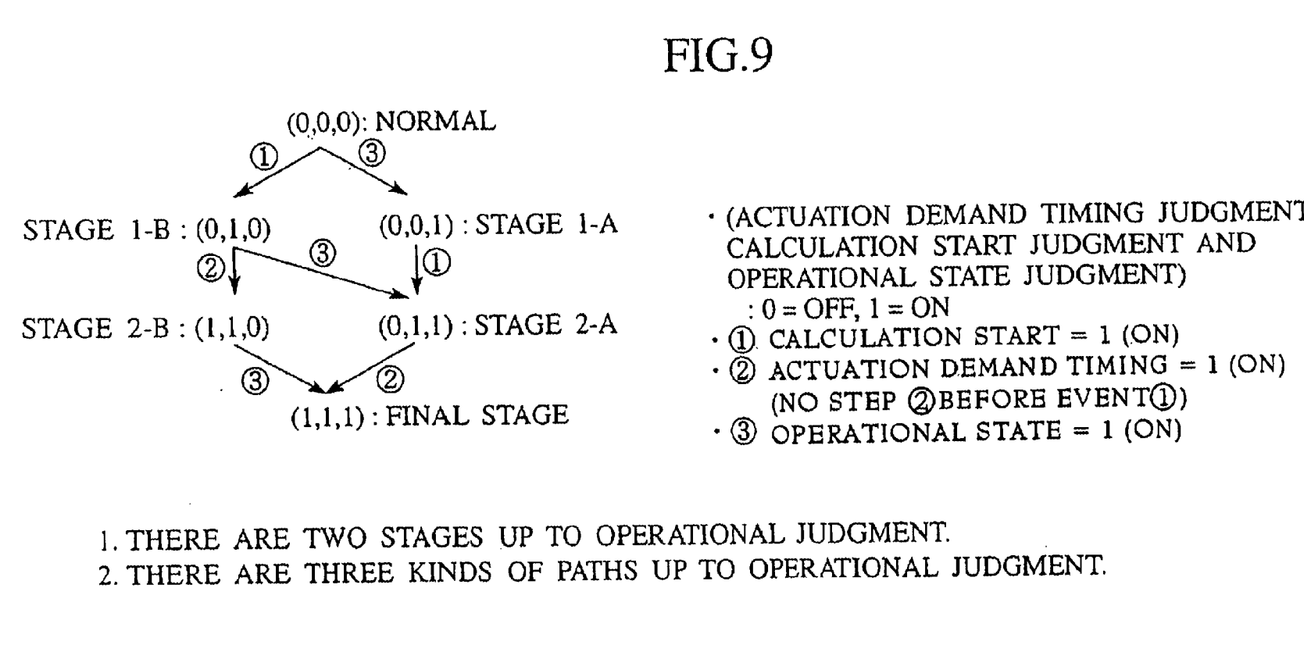
FIG. 9 is a view illustrating a typical example of the transition process among correlated stages.

As shown in FIG. 3, the first path represents a path wherein the transition process shifts through "NORMAL STAGE", "STAGE 1-A", "STAGE 2-A" and "FINAL STAGE" in a sequence. Likewise, the second path represents a path wherein the transition process shifts through "NORMAL STAGE", "STAGE 1-B", "STAGE 2-A" and "FINAL STAGE". Similarly, the third path represents a path wherein the transition process shifts through "NORMAL STAGE", "STAGE 1-B", "STAGE 2-B" and "FINAL STAGE". Also, the transition occurs among the various stages in a manner as shown in FIG. 9.

As shown in FIG. 3, three patterns of DATA 5 to DATA 7 involving the operative state judgment are prepared with a view to permitting data representative of the operative state judgment to include proper path information, enabling the impact detector unit 3 to distinguish data from one another depending on the particular transition processes that have shifted from "STAGE 2-A" or "STAGE 2-B" to "FINAL STAGE".

That is, in a case where the transition process occurs in the first path, DATA 5 is selected. In a case where the transition process occurs in the second path, DATA 6 is selected and, in case of the third path, DATA 7 is selected.

FIGS. 4 to 7 show flow charts illustrating the basis sequence of operations of the occupant restraint system 1 of the preferred embodiment, with the operation of the system 1 being described below in conjunction with respective paths (i.e. the first path to the third paths). First, a detailed description is given to the first path.

First, when an ignition switch of the vehicle is turned on, the impact detector unit 3 and the control unit 4 are turned on to start the operation.

In the absence of any impact exerted to the vehicle, all the actuation demand timing judgment factor, the calculation enabling judgment factor and the operation enabling judgment factor all remain in the disabled states. Under this circumstance, the impact detector unit 3 outputs DATA 0 (0, 0, 0) from the transmitter 10 to the control unit 4. The receiver 11 receives this DATA 0 which in turn is delivered to the receiving information discriminating section 12, which consequently discriminates that the current state remains in "NORMAL STAGE".

The receiving information discriminating section 12 is programmed to have an initial state with "STATUS= NORMAL", "PATH=00 h=00000000 (1 byte data) and "NUM (DATAn)=00 h (1 byte DATA), where "h" or "Hex" means hexadecimal notation. Here, the word "STATUS" refers to a parameter that represents the status of the various stages discussed above. The word "PATH" refers to a particular parameter indicative of particular route through which the transition process shifts in the various stages, and the word "NUM (DATAn)" represents the number of times wherein "DATAn" is referred to.

Figure 4:
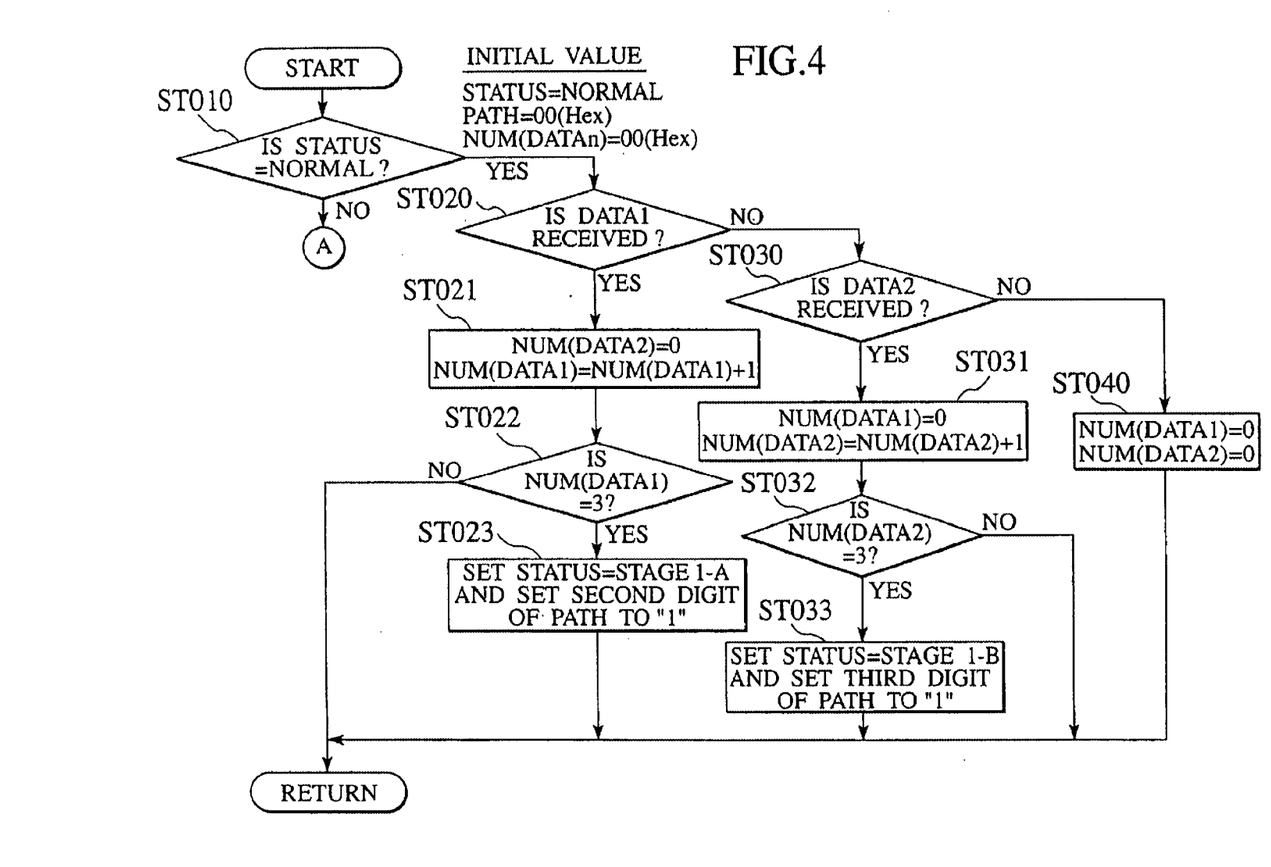
FIG. 4 is a first view component illustrating a first part of a basic sequence of operation of the occupant restraint system of the preferred embodiment shown in FIG. 1.

Under an initial condition, "STATUS" remains in "NORMAL STAGE" which corresponds to "YES" in step ST 010 in FIG. 4 and the operation goes to step ST 020 where it is discriminated whether DATA 1 is received.

In case of the vehicle encountering impact or rollover (turnover), if the integral result of the sensory output of the second acceleration sensor 6b exceeds the third threshold value, the operational state judgment is enabled such that the impact detector unit 3 outputs DATA 1 (0, 0, 1) as indicated by "YES" in step ST 020. Then, the impact detector unit 3 sets "NUM (DATA 2)" to binary "0" while incrementing "NUM (DATA 1)" in step ST 021.

In case of "NUM (DATA 1)"=3, i.e. when DATA 1 (0, 0, 1) is successively referred to three times as shown by "YES" in step ST 022, the impact detector unit 3 shifts the stage from "NORMAL STAGE" to "STAGE 1-A", i.e. "STATUS=STAGE 1-A". Also, a second digit of a binary 8 digits indicating "PATH" is set to binary "1" in step ST 023, i.e. "PATH =(0, 0, 0, 0, 0, 0, 1, 0)". A second digit of "PATH" indicated in the binary 8 digits is set to binary "1" responsive to DATA 1. In this respect, when DATA 2 is applied, a third digit is set to binary "1", and when DATA 3 is applied, a fourth digit is set to binary "1". Likewise, when DATA 4 is applied, a fifth digit is set to binary "1".

Figure 5:
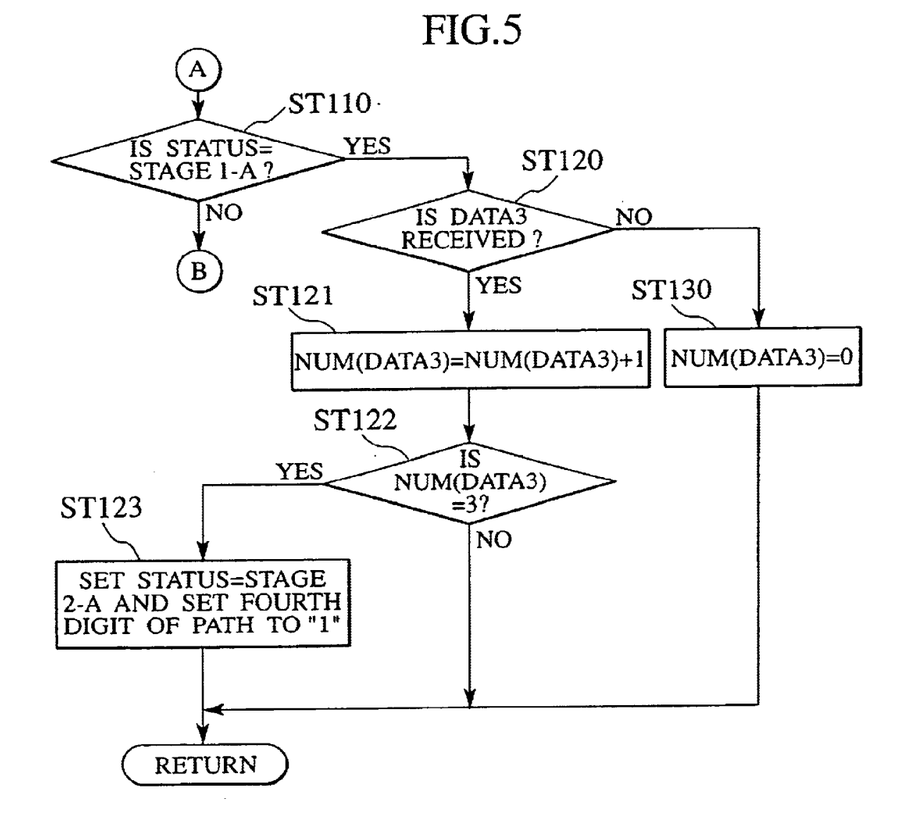
FIG. 5 is a second view component illustrating a second part of the basic sequence of operation of the occupant restraint system of the preferred embodiment shown in FIG. 1.

In a consecutive operation, "STATUS" is not in the "NORMAL STAGE" as indicted by "NO" in step ST 010 and remains in "STAGE 1-A" as indicated by "YES" in step ST 110 in FIG. 5. When this takes place, it is discriminated whether DATA 3 (0, 1, 1) is applied in step ST 120.

Focusing now on a particular case wherein the sensory output of the first acceleration sensor 6a exceeds the second threshold value, the calculation start judgment is enabled, providing DATA 3 (0, 1, 1) as shown by "YES" in step ST 120 for incrementing NUM (DATA 3) in step ST121. Then, due to the reference to DATA 3 (0, 1, 1) three times as indicated by "YES" in step ST 122, the impact detector unit 3 shifts the stage from ""STAGE 1-A" to "STAGE 2-A", i.e. "STATUS=STAGE 2-A" while setting a fourth digit of "PATH" to binary "1", i.e. "PATH=(0, 0, 0, 0, 1, 0, 1, 0).

Subsequently, since "STATUS=STAGE 2-A", the result of step ST310 in FIG. 7 becomes "YES". Here, if the integral result of the sensory output of the first acceleration sensor 6a exceeds the first threshold value, DATA 5 (1, 1, 1) is transmitted. Thus, in step ST 320, it is discriminated whether such DATA is referred to at once and, if so, step ST 320 represents "YES". Then, the operation goes to step ST 321 where it is discriminated whether the status remains in "PATH=(0, 0, 0, 0, 1, 0, 1, 0). If, in this case, the result is "YES", the control unit 4 makes a determination that the proper path (i. e. the first path) has elapsed, thereby producing the output to actuate the occupant restraint device 2 in step ST 322. On the contrary, in the absence of "PATH=(0, 0, 0, 0, 1, 0, 1, 0) as indicated by "NO" in step ST 321, the control unit 4 discriminates that it is an error, precluding the occupant restraint device 2 from being deployed.

Thus, the presence of utilization of the transition progress along the first path allows the occupant restraint device 2 to be deployed at a remarkably high precision.

Focusing next to the second path, in the presence of "NORMAL STAGE"(with no impact being detected), if the sensory output of the first acceleration sensor 6a exceeds the second threshold value, then, the calculation start judgment is turned on. When this occurs, DATA 2 (0, 1, 0) is output from the impact detector unit 3 to the control unit 4. That is, the result of step ST 010 in FIG. 4 represents "YES", the result of step ST 020 represents "NO", and the result of step ST 030 represents "YES".

Under such a case, in step ST 031, the impact detector unit 3 sets "NUM (DATA 1) to binary "0" while incrementing "NUM (DATA 2)". Further, the three references—for "DATA 2 (0, 1, 0)", then, the result of step ST 032 is represented by "YES", thereby shifting the stage from "NORMAL STAGE" to STAGE 1-B", i.e. "STATUS= STAGE 1-B". Also, the third digit of the "PATH" is set to binary "1" in step ST 033, i.e. PATH =(0, 0, 0, 0, 0, 1, 0, 0).

Figure 6:
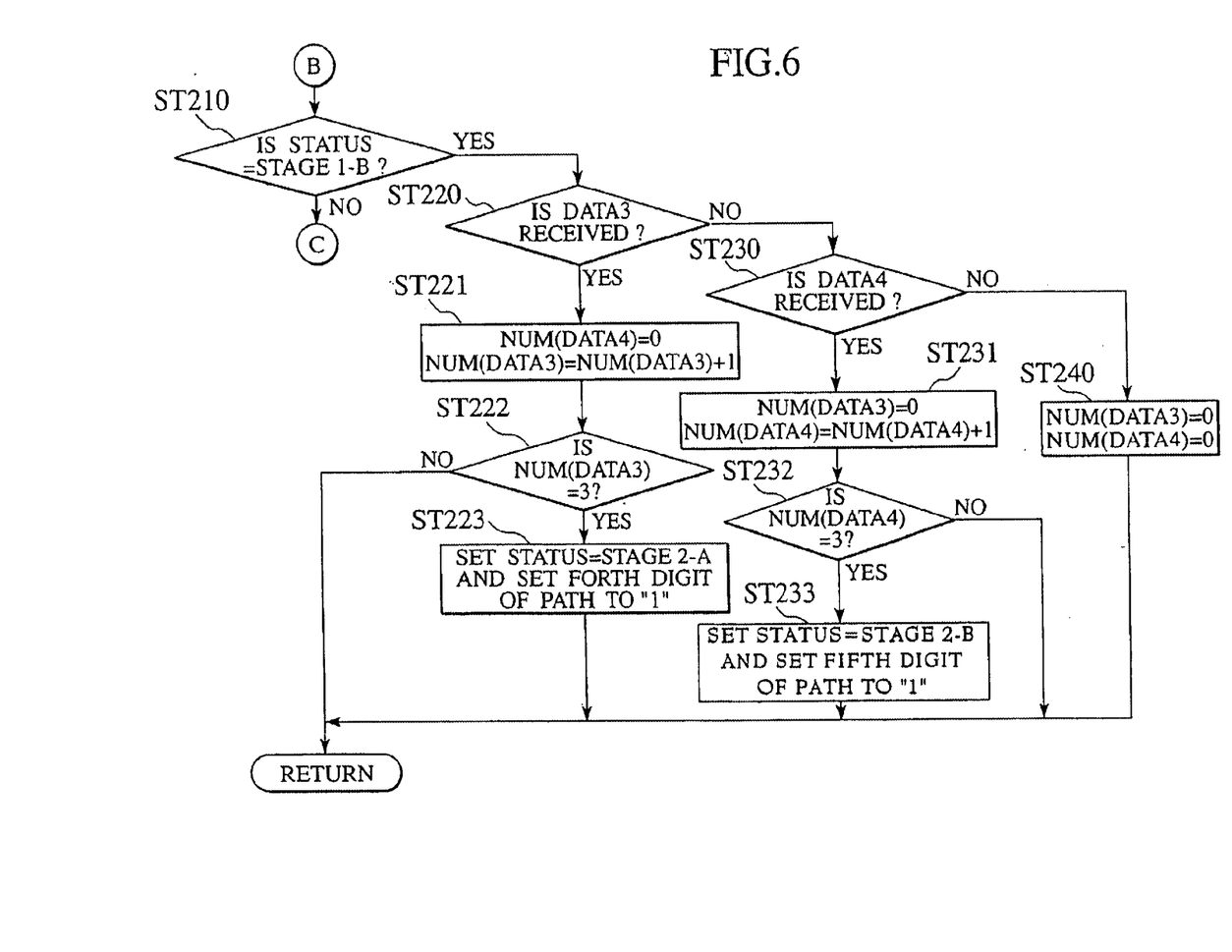
FIG. 6 is a third view component illustrating a third part of the basic sequence of operation of the occupant restraint system of the preferred embodiment shown in FIG. 1.

Consecutively, since "STATUS=STAGE 1-B", the result of step ST 210 in FIG. 6 is represented by "YES". If, in this instance, DATA 3 (0, 1, 1) is transmitted to the control unit 4 as indicated by "YES" in step ST 220, NUM (DATA4) is set to binary "0", while incrementing NUM (DATA 3) in step ST 221. Subsequently, upon confirmation of the three references for DATA 3 (0, 1, 1) as indicated by "YES" in step ST 222, the impact detector unit 3 shifts the stage from "STAGE 1-B" to "STAGE 2-A" to represent "STATUS= STAGE 2-A". In this instant, the fourth digit of "PATH" is set to "1" in step ST 233, i.e. PATH=(0, 0, 0, 0, 1, 1, 0, 0).

Figure 7:
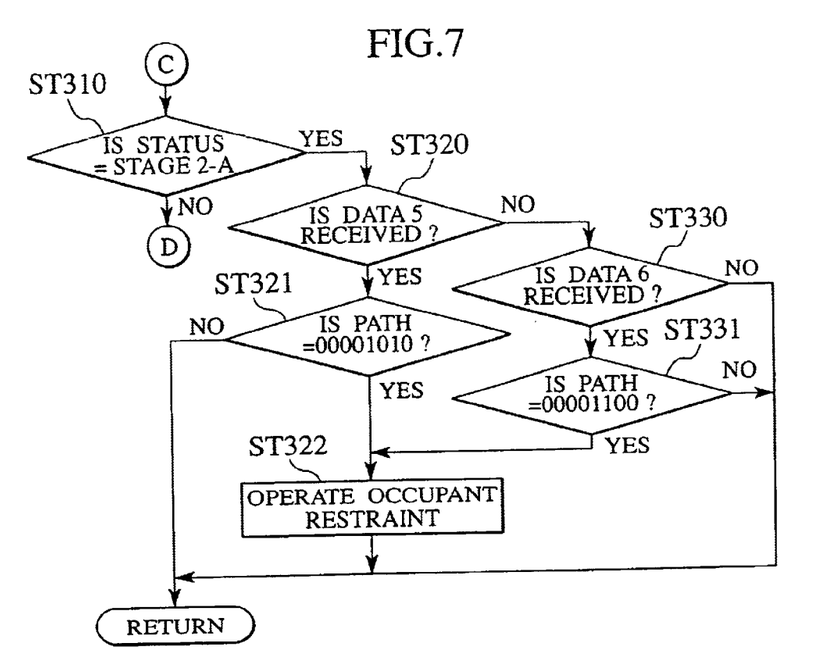
FIG. 7 is a fourth view component illustrating a fourth part of the basic sequence of operation of the occupant restraint system of the preferred embodiment shown in FIG. 1.

Successively, since "STATUS=STAGE 2-A", the result of step ST 310 in FIG. 7 represents "YES". Here, if the integral result of the sensory output of the first acceleration sensor 6a exceeds the first threshold value, DATA 6 (1, 1, 1) is transmitted to the control unit 4 from the impact detector unit 3. When this occurs, in step ST 320, it is discriminated whether such DATA is referred to and, if so, step ST 320 represents "NO" while the result of step ST 330 is "YES". When data of "PATH", i.e. when the status "PATH=(0, 0, 0, 0, 1, 1,0, 0) exists, the result is "YES" in step ST 331. When this takes place, the control unit 4 makes a determination that the proper path (i. E. the second path) has elapsed., thereby producing the actuation signal to deploy the occupant restraint device 2 in step ST 322. On the contrary, in the absence of "PATH=(0, 0, 0, 0, 1, 1,0 0) as indicated by "NO" in step ST 331, the control unit 4 discriminates that it is an error, precluding the occupant restraint device 2 from being deployed.

Thus, the presence of utilization of the transition progress along the second path allows the occupant restraint device 2 to be deployed at a remarkably high precision.

Focusing lastly to the third path, the third path takes the same steps as the second path up to the STAGE 1-B, and, therefore, a detailed description of the steps up to step ST 033 is herein omitted.

After the transition progress reaches "STAGE 1-B" as shown by "YES" in step ST 210 in FIG. 6, if the actuation demand timing judgment is enabled, the impact detector unit 3 outputs DATA 4 (1, 1, 0) as represented by "NO" in step ST 220 and by "YES" in step ST 230, thereby setting NUM (DATA 3) to binary "0" and incrementing NUM (DATA 4) in step ST 231. Subsequently, if there are three references for "DATA 4 (1, 1, 0)" as represented by "YES" in step ST 232, then, the stage is shifted from "STAGE 1-B" to STAGE 2-B", i.e. "STATUS=STAGE 2-B". Also, the fifth digit of the "PATH" is set to binary "1", i.e. PATH=(0, 0, 1, 0, 1, 0, 0) in step ST 233.

Figure 8:
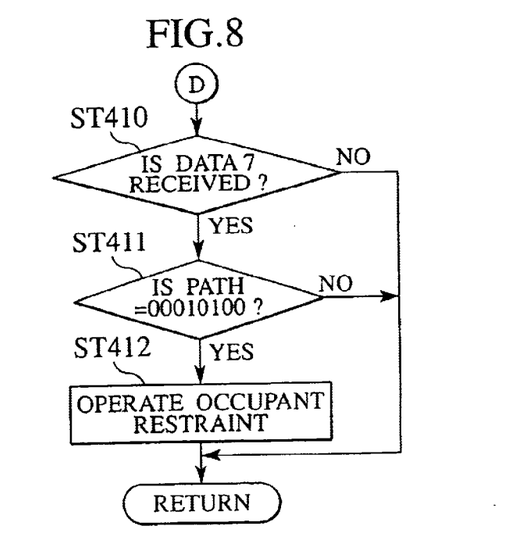
FIG. 8 is a fifth view component illustrating a fifth part of the basic sequence of operation of the occupant restraint system of the preferred embodiment shown in FIG. 1.

Consecutively, since "STATUS=STAGE 2-B", the result of step ST 310 in FIG. 7 becomes "NO" and the operation goes to step ST410 in FIG. 8. If, in this instance, the operational state judgment is enabled, DATA 7 (1, 1, 1) is applied to the control unit 4 as indicated by "YES" in step ST 410. If "PATH" data is discriminated to be "PATH=(0, 0, 0, 1, 0, 1,0, 0) as indicated by "YES" in step ST 411, the control unit 4 makes a determination that the proper path (i. e. the third path) has elapsed, thereby producing the actuation signal to actuate the occupant restraint device 2 in step ST 412. On the contrary, in the absence of "PATH=(0, 0, 0, 1, 0, 1,0 0) as indicated by "NO" in step ST 411, the control unit 4 discriminates that it is an error, precluding the occupant restraint device 2 from being deployed.

Thus, the presence of utilization of the transition progress along the third path allows the occupant restraint device 2 to be deployed at a remarkably high precision.

Further, in "NORMAL STAGE", if the control unit 4 is neither applied with DATA 1 nor DATA 2, the control unit 4—sets both NUM (DATA 1) and NUM (DATA 2) to binary "0" in step ST 040. In "STAGE 1-A", if DATA 3 is not received, then, NUM (DATA 3) is set to binary "0" in step ST 130. Likewise, in STAGE 1-B, if DATA 3 or DATA 4 are not received, then, the both NUM (DATA 3) and NUM (DATA 4) are set to binary "0" in step ST 240.

Although not explicitly shown the flow charts, the absence of variation in received data for a predetermined time interval cause the control unit 4 to make a determination that there is no need for actuating the occupant restraint device 2 while allowing the operation to be shifted to "NORMAL STAGE". The time period may be, for example, more than 150 ms during a time period when the control unit 4 is supplied with data except DATA 0 representation of the transition progress prior to an impact on the vehicle.

It will thus be appreciated from the foregoing description that, in accordance with the occupant restraint system of the present invention, appropriate deployment variables are based on the discriminating factors involving the actuation demand timing judgment, the calculation start judgment and the operational state judgment, which represent the status of impact exerted to the vehicle, and whose ON/OFF states are correlated with the various paths (i.e. the first path to the third path) representative of the particular transition progresses for respective stages. The control unit 4 is programmed to implement comparison between path information contained in the output signals transmitted from the impact detector unit 3 and associated path information stored in the control unit 4 to produce the actuation signal only when coincidence exists between relevant path information items. As a consequence, even in the presence of noise superimposed on the communication signals passing through the communication line 5 between the impact detector unit 3 and the control unit 4, it is possible for the occupant restraint system 1 to be appropriately deployed without causing any errorneous operation.

Further, in the progress of transition from "NORMAL STAGE" to "STAGE 2-A" or "STAGE 2-B", the presence of identical data received at three times by the control unit 4 is confirmed, with a resultant increased precision in transmission of the output signals. Furthermore, during a transition period from "STAGE 2-A" or "STAGE 2-B" to the "FINAL STAGE", since the number of data reference is programmed to be one time, data reference can be implemented in a rapid manner, enabling the occupant restraint device 2 to be instantaneously deployed. With such specific arrangement, the vehicle may have a further improved safety circumference.

While the present invention has been described above with reference to the vehicle occupant restraint system of a particular embodiment and the method of operating the occupant restraint device, the present invention is not limited to the particular embodiment and those skilled in the art will perceive improvements, changes and modifications.

For example, in the preferred embodiment, although the detailed description has been given above with respect to the example wherein data reference is carried out three times for the transition progress up to "STAGE 2-A" or "STAGE 2-B", the present invention is not limited thereto and data reference may be carried out at one time, two times, or more than four times.

Although the present invention has been described above by reference to certain embodiments of the invention, the invention is not limited to the embodiments described above and modifications will occur to those skilled in the art, in light of the teachings. The scope of the invention is defined with reference to the following claims.

What is claimed is:

1. An occupant restraint system for a vehicle having an occupant restraint device to permit the occupant restraint device to be deployed for restraining an occupant in the vehicle when impact, applied to the vehicle, is detected, said system comprising:

an impact detector unit including at least two impact sensors detecting impact to a vehicle to provide sensory outputs representative of impact status, said impact detector unit being responsive to the impact status for providing at least two discriminating factors based on which at least two predetermined transition processes are set, to cause said occupant restraint device to be deployed, and producing information representing an enabled/disabled state of said discriminating factors related to transition process information; and a control unit outputting an actuation signal to said occupant restraint device when there is a confirmed match between a variation in said information representing said enabled/disabled state received from said impact detector unit, and said transition process information, wherein:

said impact detector unit includes a first impact sensor and a second impact sensor; and wherein said discriminating factors include an actuation demand timing judgment factor which is enabled when an integral result of a sensory output of said first impact sensor exceeds a first threshold value, a calculation enabling judgment factor which is enabled when the sensory output of said first impact sensor exceeds a second threshold value, and an operation enabling judgment factor which is enabled when an integral result of a sensory output of said second impact sensor exceeds a third threshold value.

2. The occupant restraint system according to claim 1, wherein:

said first and third threshold values are determined to be substantially identical to one another.

3. The occupant restraint system according to claim 1, wherein:

at least one said transition process includes a plurality of stages representing said discriminating factors, respectively; and wherein said stages include:

a NORMAL STAGE determined to represent that all of said discriminating factors are disabled;

a FIRST-A STAGE determined to represent that said operation enabling judgment factor is enabled subsequent to said NORMAL STAGE;

a FIRST-B STAGE determined to represent that said calculation enabling judgment factor is enabled subsequent to said NORMAL STAGE;

a SECOND-A STAGE determined to represent that said calculation enabling judgment factor is enabled subsequent to said FIRST-A STAGE or that said operation enabling judgment factor is enabled subsequent to said FIRST-B STAGE;

a SECOND-B STAGE determined to represent that said actuation demand timing judgment factor is enabled subsequent to said FIRST-B STAGE; and a FINAL STAGE determined to represent that said actuation demand timing judgment factor is enabled subsequent to said SECOND-A STAGE or that said operation enabling judgment factor is enabled subsequent to said SECOND-B STAGE; and wherein said control unit is operative to deploy said occupant restraint device when said at least one transition process reaches said FINAL STAGE.

4. The occupant restraint system according to claim 3, wherein:

transition between said NORMAL STAGE and said FIRST-A STAGE, transition between said NORMAL STAGE and said FIRST-B STAGE, transition between said FIRST-A STAGE and said SECOND-A STAGE, transition between said FIRST-B STAGE and said SECOND-A STAGE and transition between said FIRST-B STAGE and said SECOND-B stage are carried out by receiving said discriminating factors a plurality of times; and transition between said SECOND-A STAGE and said FINAL STAGE and transition between said SECOND-B STAGE and said FINAL STAGE are carried out by receiving said discriminating factors at least one time.

5. An occupant restraint system for a vehicle having an occupant restraint device to permit the occupant restraint device to be deployed for restraining an occupant in the vehicle when impact, applied to the vehicle, is detected, said system comprising:

impact detecting means including at least two impact sensors detecting impact applied to a vehicle to provide sensory outputs representative of impact status, said impact detecting means being responsive to the impact status for providing at least two discriminating factors based on which at least two predetermined transition processes are set to cause said occupant restraint device to be deployed and producing information representing an enabled/disabled state of said discriminating factors related to transition process information; and control means outputting an actuation signal to said occupant restraint device when there is a confirmed match between a variation in said information representing said enabled/disabled state, received from said impact detecting means, and said transition process information wherein said detecting means includes a first impact sensor and a second impact sensor; and wherein said discriminating factors include an actuation demand timing judgment factor which is enabled when an integral result of a sensory output of said first impact sensor exceeds a first threshold value, a calculation enabling judgment factor which is enabled when the sensory output of said first impact sensor exceeds a second threshold value, and an operational enabling judgment factor which is enabled when an integral result of a sensory output of said second impact sensor exceeds a third threshold value.

6. A method for operating an occupant restraint system for a vehicle having an occupant restraint device to permit the occupant restraint device to be deployed for restraining an occupant in the vehicle when impact, applied to the vehicle, is detected, said method comprising:

detecting impact exerted to a vehicle using an impact detector unit having at least two impact sensors to provide sensory outputs representative of impact status;

preparing at least two discriminating factors based on which at least two predetermined transition processes are set to cause said occupant restraint device to be deployed; producing information representing an enabled/disabled state of said discriminating factors involving transition process information; and outputting an actuation signal to said occupant restraint device when there is a confirmed match between a variation in said information representing said enabled/disabled state, received from said impact detector unit, and said transition process information;

wherein said impact detector unit includes a first impact sensor and a second impact sensor; and wherein said discriminating factors include an actuation demand timing judgment factor which is enabled when an integral result of a sensory output of said first impact sensor exceeds a first threshold value, a calculation enabling judgment factor which is enabled when the sensory output of said first impact sensor exceeds a second threshold value, and an operation enabling judgment factor which is enabled when an integral result of a sensory output of said second impact sensor exceeds a third threshold value.

* * * * *